Aug. 31, 1965 R. M. WEYGANDT ETAL 3,203,159
METHOD OF HARVESTING BERRIES AND SIMILAR PRODUCE
FROM THEIR PLANTS
Filed July 29, 1963 5 Sheets-Sheet 1

RAYMOND M. WEYGANDT
RAYMOND A. WEYGANDT
*INVENTORS*

BY *James L. Girnan*
ATT'Y

Aug. 31, 1965    R. M. WEYGANDT ETAL    3,203,159
METHOD OF HARVESTING BERRIES AND SIMILAR PRODUCE
FROM THEIR PLANTS
Filed July 29, 1963    5 Sheets-Sheet 2
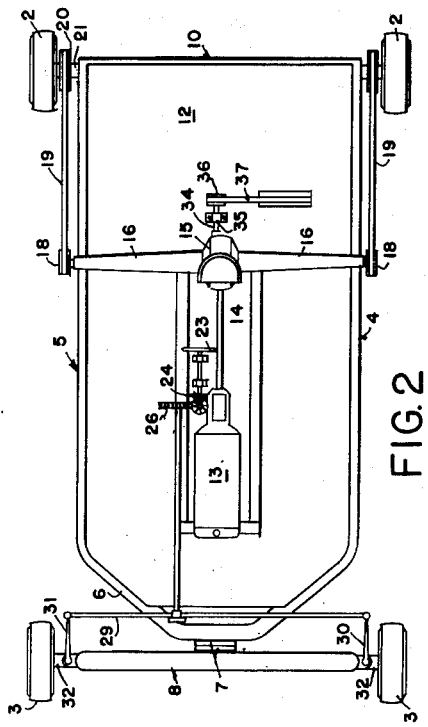
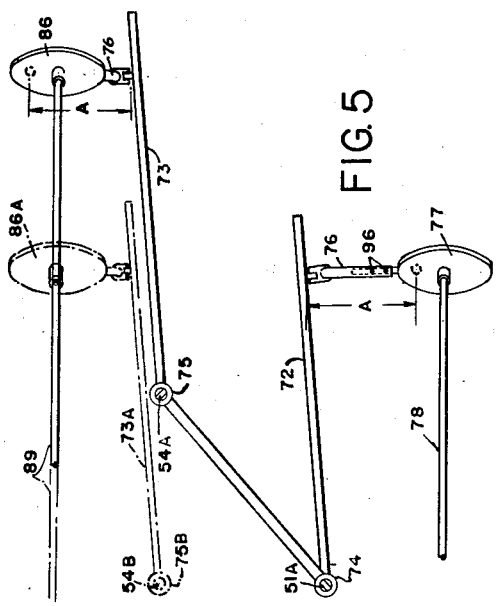
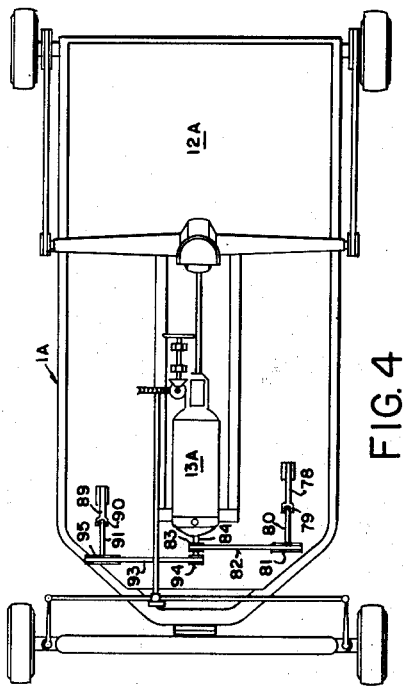
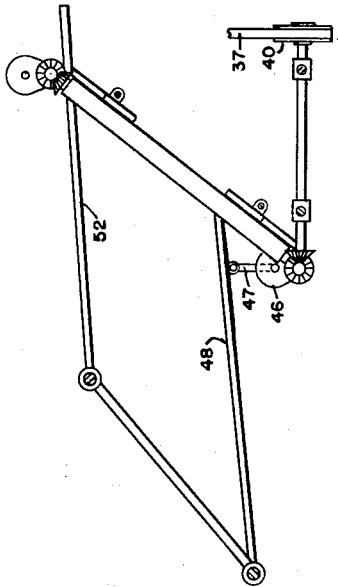
RAYMOND M. WEYGANDT
RAYMOND A. WEYGANDT
*INVENTORS*
BY *James Linnan*
ATT'Y

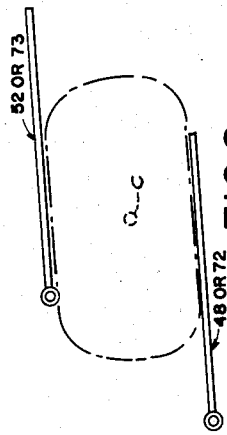
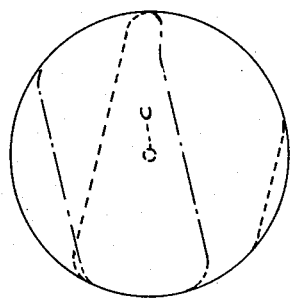
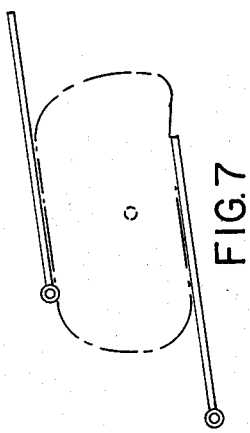
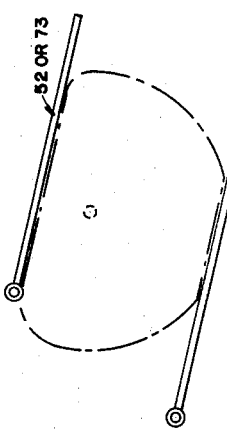
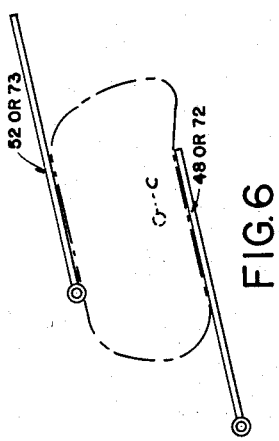
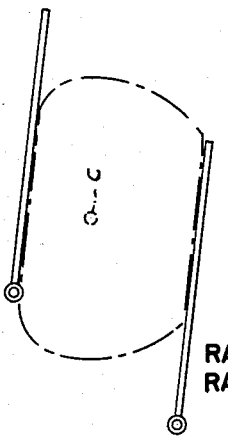

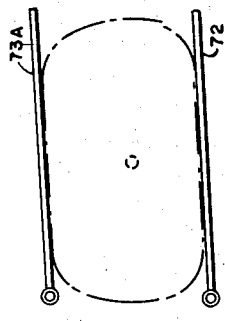
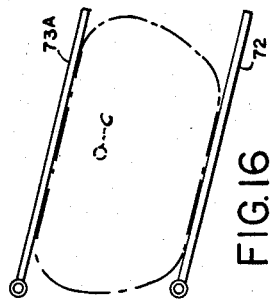
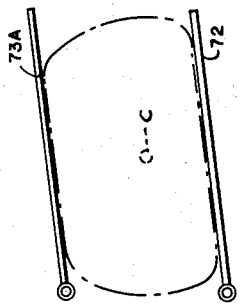
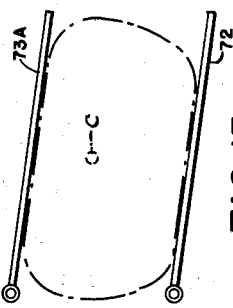
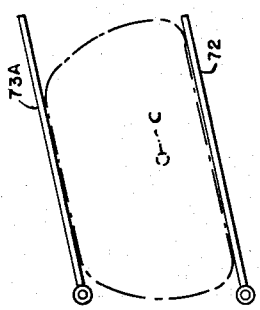
RAYMOND M. WEYGANDT
RAYMOND A. WEYGANDT
*INVENTORS*

Aug. 31, 1965    R. M. WEYGANDT ETAL    3,203,159
METHOD OF HARVESTING BERRIES AND SIMILAR PRODUCE
FROM THEIR PLANTS
Filed July 29, 1963    5 Sheets-Sheet 5
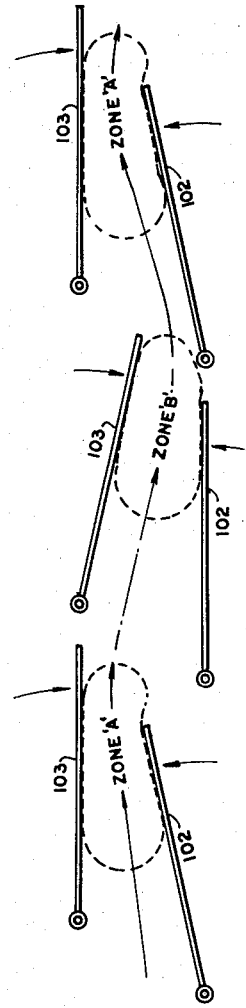
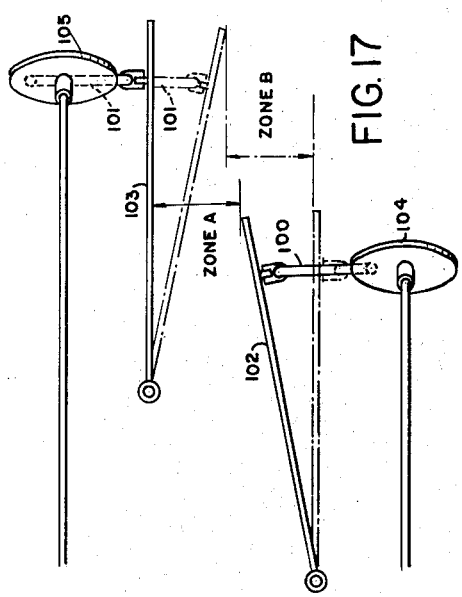
RAYMOND M. WEYGANDT
RAYMOND A. WEYGANDT
    INVENTORS

United States Patent Office 3,203,159
Patented Aug. 31, 1965

3,203,159
METHOD OF HARVESTING BERRIES AND SIMILAR PRODUCE FROM THEIR PLANTS
Raymond M. Weygandt and Raymond A. Weygandt,
both of Rte. 1, Box 308, Canby, Oreg.
Filed July 29, 1963, Ser. No. 298,219
2 Claims. (Cl. 56—1)

This application is a continuation in part of our co-pending application Serial No. 202,037, filed May 28, 1962, now Patent No. 3,126,692.

This invention relates to improvements in the harvesting of ripe fruit or berries from row plants or row bushes.

An important object of the present invention is to solve the labor problem in the harvesting of such fruit or berries by providing for mechanical harvesting.

The apparatus which may be used to practice the method of this invention is of the type shown in our said co-pending application and preferably comprises a self-propelled vehicle adapted to straddle a row of plants or bushes as it travels therealong and provided with fruit or berry dislodging means in the form of vertically disposed panels which may be transversely aligned relative to the apparatus or in off-set relation to each other in the direction of the length of the apparatus.

The fruit dislodging panels may be of square or rectangular shape and so arranged as to provide a zone of compression into which the bushes are confined to passage and subjected to oscillatory motion during such passage.

The foregoing and other objects and advantages which will become subsequently apparent reside in the operation as more fully hereinafter described and claimed, reference being had to the accompanying drawings forming a part hereof and in which:

FIGURE 2 is a top plan view of FIGURE 1 on a reduced scale.

FIGURE 3 is a top plan view of fruit dislodging members and actuating mechanism therefor, on the scale of the drawing of FIGURE 1.

FIGURE 4 is a view similar to FIGURE 2 showing a modified form of driving mechanism for the modified fruit dislodging members of FIGURE 5.

Figure 1:
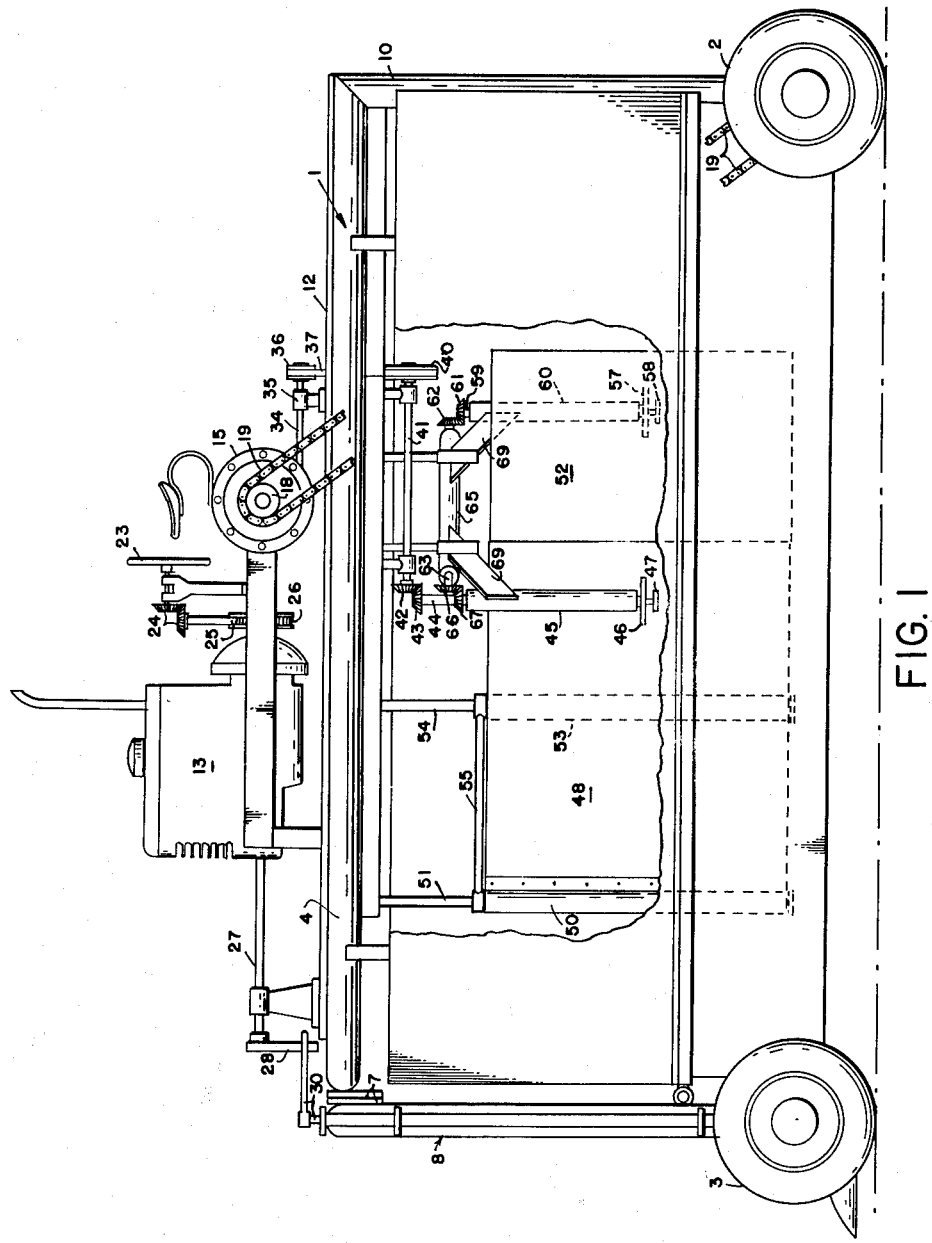
FIGURE 1 is a side elevational view of a harvesting machine suitable for practicing the method embodying the principles of the invention. Fragments of the machine are shown broken away to reveal internal parts.

FIGURES 6, 7, and 8 are views illustrating diagrammatically the manner in which the fruit dislodging members shown in full lines in FIGURES 3 and 4 slidably and compressively impinge in unison against a berry bush in one transverse direction along the row.

FIGURES 9 and 10 show such action of the fruit dislodging members in an opposite transverse direction resulting in the compressing and shaking action of the bush as illustrated diagrammatically in FIGURE 11.

FIGURES 12 to 16 are views similar to FIGURES 6–10 illustrating the manner in which the fruit dislodging members as shown in broken lines in FIGURE 5 compressively impinge against both sides of the bushes being dealt with.

FIGURE 17 is a view similar to FIGURE 5 showing the fruit dislodging members converging rearwardly relative to each other and to the machine and which relationship they maintain throughout their operative range in cooperatively and progressively subjecting each bush to passage through a compression zone of gradually increasing magnitude, and FIGURE 18 illustrates diagrammatically the zig-zag action of the fruit dislodging members as the machine travels along the row and which action progressively transmits a translated side-to-side shaking motion to each bush in the row.

With continuing reference to the drawings wherein like reference characters designate like parts and particularly FIGURES 1 and 2 thereof, the machine illustrated therein is somewhat the same as the harvesting machine shown and described in our above mentioned co-pending application and comprises a main frame indicated generally at 1 supported upon ground engaging traction wheels 2 and steerable idling wheels 3.

The top of the frame comprises longitudinal members 4 and 5 which converge at their forward ends as at 6 and thereat attached by wearplates 7 to the top of an inverted U-shaped front frame 8 and fixedly secured to the top of an inverted rear frame 10.

A deck 12 is secured to the longitudinal members 4 and 5 by any suitable means and mounted on the deck is an internal combustion engine 13 of any suitable type and horsepower connected in the conventional manner by a drive shaft 14 to a differential within a housing 15 and to two driving axles (not shown) within axle housings 16. The ends of the axles are provided with sprocket wheels 18 connected by sprocket chains 19 to driven sprockets 20 near the outer end of the axles 21 of the traction wheels 2.

The machine is steerable by any suitable steering mechanism comprising a steering wheel 23, bevel gears 24, worm and worm gears 25–26, steering column 27, connected by a link 28, to a tie-rod 29 which is connected as at 30 and 31 to steerable axles 32 of the front wheels 3.

A power take-off shaft 34 from the differential house 15 is journaled as at 35 on the deck 12 and provided at its outer end with a driving pulley 36 having a belt 37 entrained thereover, extending downwardly through the deck 12, over a driven pulley 40 (see FIGURE 1) secured to one end of a driven shaft 41 to whose opposite end is secured a bevel gear 42 meshed with a similar gear 43 secured to the top end of a shaft 44 rotatable within a vertical tubular member 45 and provided at its bottom end with a cam 46 connected by a link 47 to one (48) of two fruit dislodging panel members. This panel member 48 is hingedly attached as at 50 to a supporting shaft 51 secured to and depending from the top of the main frame 1.

The other fruit dislodging panel member 52 is hingedly attached as at 53 to its supporting shaft 54 also depending from the top of the main frame 1. Both supporting shafts 51 and 54 are interconnected by a spacer link 55 to provide a rigid support for the forward end of said panels 48 and 52. The panel member 52 is connected to its respective actuating cam 57 which is linked as at 58 to a driving shaft 59 rotatable within a vertical tubular member 60 and provided at its top end with a bevel gear 61 meshing with a companion gear 62 on one end of a cross shaft 63 rotatable within a horizontal tubular member 65 and provided at its opposite end with a second bevel gear 66 meshing with a companion gear 67 also secured to and rotatable with the shaft 44. The tubular members 45 and 60 and the horizontal tubular member 65 are interconnected by diagonal bracing members 69.

In the modification shown in full lines in FIGURE 5, the fruit dislodging panel members 72 and 73 are hingedly attached to their respective supporting shafts 51A and 54A depending from the top of the frame 1A (FIGURE 4) in the same manner as the shafts 51 and 54 of FIGURE 1. The opposite end of the panel 72 is connected by lengthwise adjustable link 76 to a driving cam 77 secured to one end of a driven shaft 78 whose opposite end extends upwardly through the deck 12A of the machine of FIGURE 4 and connected by a universal joint 79 to a shaft 80 to which is secured a pulley 81 driven by a belt 82 entrained thereover and over a driving pulley 83 secured to a power out put shaft 84 at the forward end of the engine 13A.

The companion panel 73 is similarly driven by a cam 86 connected to a shaft 89 which is connected by a universal joint 90 (see FIG. 4) to one end of a shaft 91 also driven by the power output shaft 84 of the engine by a belt 93 and driving and driven pulleys 94 and 95. The links 76 interconnecting the panels 72-73 to their respective cams are adjustable lengthwise and lockable by means of set screws or the like 96 in any adjusted extended or retracted position.

As shown in FIGURE 5, the panels 72 and 73 may be off-set relative to each other in the direction of the length of the machine as illustrated in full lines, or they may be in transverse alignment with each other as shown in broken lines.

The connecting links 76 of both panels 72 and 73 are shown as being of equal length, therefore, both panels will swing in unison in parallel relation to each other throughout their operative range when in either of the full or broken line positions above referred to, and the same is true of the panels 48 and 52 in FIGURE 3.

As shown in FIGURE 17, the links 100-101 interconnecting the fruit dislodging panels 102-103 with their respective operating means 104-105 are also of equal length, but longer than those shown and described in FIGURE 5 so that the panels will at all times converge rearwardly in the direction of the length of the machine to provide a compression zone wherein the compressive forces gainst both sides of a bush are of gradually increasing magnitude as the bush passes through the panels as illustrated diagrammatically in FIGURE 18.

In FIGURES 6-10, it will be noted that the panels 48 and 52, or 72 and 73 are in parallel relation to each other with their hinge points offset as also shown in full lines in FIGURES 3 and 5, and that in FIGURES 12-16 the panels 72-73A are also in parallel relation but with their hinge points in transverse alignment.

From the foregoing, and with both panels in operation and arranged relative to each other, either as shown in FIGS. 6-10, or in FIGS. 12 to 18, it will be readily apparent that as the panels slidably and compressibly impinge in unison against both sides of the bush first in one transverse direction and then in an opposite transverse direction the resulting compressing and shaking action of the bush will be as illustrated diagrammatically in broken and dotted lines in FIGURES 11, and that the brush will will be subjected to tortuous passage through zones of compression of gradually increasing magnitude between the panels 102-103 as indicated at A, B and A in FIGURES 17 and 18.

The vertical center axis of a bush, or bushes, being dealt with is indicated at C in FIGURES 6-16 and we obtain satisfactory results by causing the fruit dislodging panels to cooperatively impinge the sides of the bush at a rate of not less than two times per second and with the oscillating or swinging stroke of the panels stopping short of the vertical center axis C of the bush while maintaining their spaced relationship will thereby shake each bush in its entirety and dislodge the ripe berries therefrom.

Although the harvesting machine is herein shown and described for use, though not restrictively, in harvesting ripe berries from bushes with upwardly reaching foliage, branches, fruit canes, et cetera, in contrast to vine-borne fruit, it is important in such use that the bush impinging surfaces of the fruit-dislodging panel members, in all of their various inter-relationships herein shown, be of a height at least co-extensive with that of the bush foliage from the bottom to the top thereof to insure thorough shaking of the bush in its entirety.

While we have shown a particularly form of embodiment of our invention, we are aware that many minor changes therein will readily suggest themselves to others skilled in the art without departing from the spirit and scope of the invention. Having thus described our invention what we claim as new and desire to protect by Letters Patent is:

1. The method of dislodging ripe fruit from a fruit-bearing bush or the like having a substantially vertical center axis without engaging individual branches, leaves and the like comprising the steps of: progressively moving a compression trough open at upper and lower ends along the entire height of a fruit-bearing bush or the like and compressing and confining the entire bush simultaneously from two opposed continuous vertical planes along the entire height of the bush from opposite sides of the path of travel of said trough toward the vertical center axis of the bush during the entire path of travel of said compression trough; and transitionally relieving pressure along one vertical plane with respect to the vertical center axis at one side of said bush and increasing the pressure at the other side thereof while maintaining at least the initially imposed compressive force imposed on said bush.

2. In the method set forth in claim 1 including progressively increasing the initially applied compressive force applied to said bush during relative movement of said trough with respect to said bush.

References Cited by the Examiner

UNITED STATES PATENTS

| | | | |
|---|---|---|---|
| 450,584 | 4/91 | House | 56—29 |
| 2,993,323 | 11/58 | Tubbs | 56—330 |

ABRAHAM G. STONE, *Primary Examiner.*

RUSSELL R. KINSEY, T. GRAHAM CRAVER,
*Examiners.*